Figure 1:
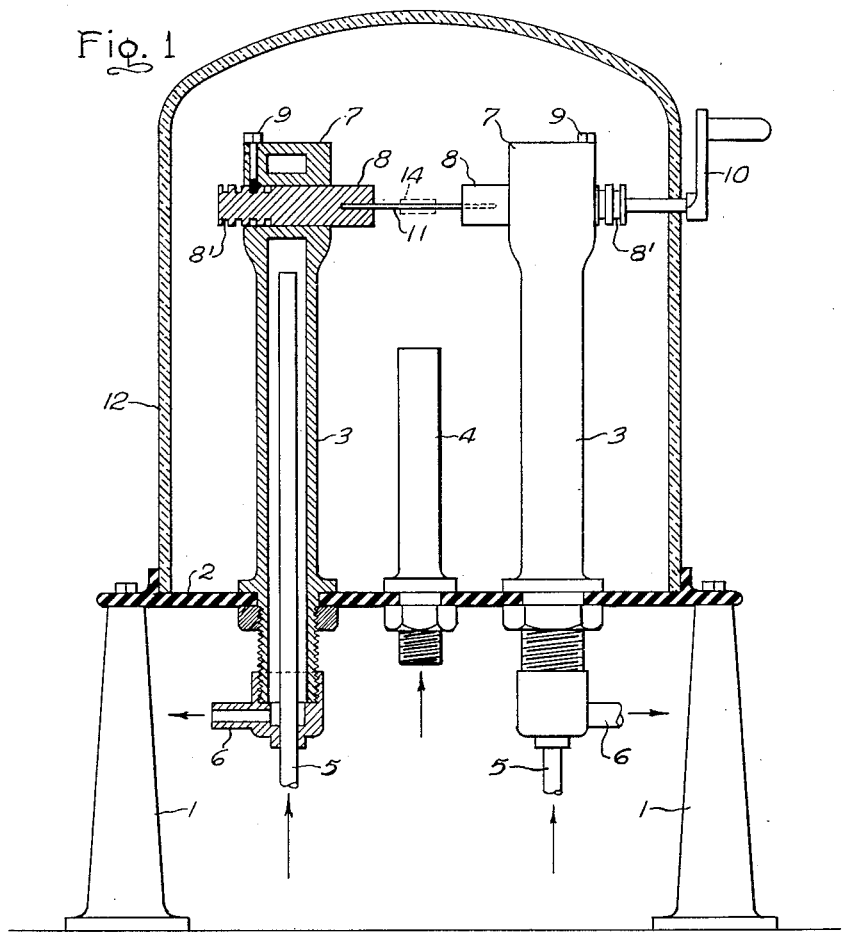

March 20, 1951 M. DESCARSIN 2,545,877
METHOD FOR SHEATHING ELECTRIC CONDUCTORS
Filed July 15, 1947

Inventor:
Maurice Descarsin,
by Vernet C. Stouffman
His Attorney.

Patented Mar. 20, 1951

2,545,877

UNITED STATES PATENT OFFICE 2,545,877

METHOD FOR SHEATHING ELECTRIC CONDUCTORS

Maurice Descarsin, Paris, France, assignor to General Electric Company, a corporation of New York Application July 15, 1947, Serial No. 761,132
In France September 19, 1944

Section 1, Public Law 690, August 8, 1946
Patent expires September 19, 1964

3 Claims. (Cl. 49—81)

The present invention relates to the sheathing of current lead-in conductors for envelopes or enclosures made of vitreous or ceramic materials, of the type used for incandescent lamps, discharge tubes and radio tubes, and in which heavy currents have to be brought inside the enclosures. The current lead-in wires are usually made of metals such as tungsten, molybdenum or special alloys and are sheathed by a vitreous material having approximately the same coefficient of expansion as the material of which the enclosure is made.

An object of the present invention is to provide an improved method for applying the sheathing. Another object is to provide a method which will produce a predetermined degree of oxidation on the lead-in. Another object is to provide a method for producing a bubble-free sheath. Further objects and advantages of the invention will appear from the following description of a species thereof and from the accompanying drawing.

It is a known fact that vacuum-tight sheaths on such lead-in wires may be obtained by oxidizing the metal to a well-defined degree and subsequently dissolving the oxide in the sheathing material at a temperature also well-defined. In order to obtain the required temperatures for oxidizing the wire and dissolving the oxide in accordance with the present invention, the lead-in is clamped between the jaws of two cooled metal heads which are insulated electrically from one another and whose spacing can be accurately adjusted. An electric circuit is used for passing the proper current for each type of lead-in to be sheathed. The assembly of the two jaws may be turned about a common axis. The whole apparatus may be housed in an enclosure in which a neutral or inert atmosphere may be maintained.

The apparatus is used as follows: First, the lead-in to be sheathed is mounted between the cooled jaws and a predetermined current is made to flow for a certain period of time through a predetermined length of the lead-in to heat it to its oxidizing temperature. The oxidation occurs in open air. If greater precision is desired, which usually is not necessary with modern metals, a bell jar provided for the purpose is put in place and an artificial, slightly oxidizing atmosphere, which always has the same composition at the same temperature, is introduced into the bell. The oxidation process may thus be made entirely automatic.

After the oxidation of the lead-in, the glass tube to be used as a sheath may be slipped over the oxidized portion thereof. The tube may be slipped over the lead-in before the oxidation thereof and rest next to the center portion to be oxidized; after the oxidation it is slid over the oxidized part. The tube having been put in place and the apparatus mounted under the bell, a neutral atmosphere is produced in the bell so as to preclude any variation in the oxidation of the metal. A current of a definite magnitude is then sent through the setup to heat the lead-in and cause the glass to melt. During the melting of the glass, the lead-in is rotated so as to uniformly spread the glass thereon.

It may be pointed out that in this method of heating the hottest point of the lead-in is the middle of the part thereof to be sheathed and that from that point the temperature drops equally on either side so that the glass will begin to melt in the middle and to first adhere to the metal there, which will allow bubbles to escape towards the ends.

Figure 2:
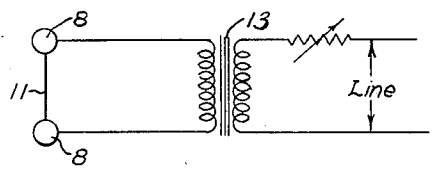

The attached drawing shows in sectional elevation in Fig. 1 an apparatus for applying vitreous sheaths to lead-in members and in Fig. 2 a wiring diagram of a circuit for supplying heater current for the lead-in.

Referring to Fig. 1, the support 1 carries a platform 2 upon which are mounted the hollow columns 3 and the tube 4. The hollow columns are cooled by a stream of water entering through the central tubes 5 and leaving by the lateral openings 6. The upper parts of these hollow columns 3 carry the hollow heads 7, also cooled, in which the chucks 8 may rotate about their common horizontal axis. The chucks 8 may be slid along their axis within the heads 7 and held in predetermined spaced relation, for example, by set screws 9 which each enter one of a series of grooves 8' in each chuck. A crank 10 serves to turn the chucks 8.

The lead-in wire 11 to be oxidized and sheathed with the glass sleeve 14 is clamped in the chucks 8. The assembly is mounted under a glass bell 12 which, with the platform 2, forms an enclosure which may be filled through the tube 4 with a gas which has the desired chemical properties or with an inert gas. The transformer 13 shown in Fig. 2 supplies the electric heater current to the chucks 8 where it passes through a definite length of the lead-in wire 11, as stated above.

What I claim as new and desire to secure by Letters Patent of the United States is:

1. The method of applying a vitreous sheath to a current lead-in of predetermined length which comprises the steps of positioning the sheath around the lead-in adjacent one end thereof, passing an electric current of predetermined magnitude through the lead-in in an oxidizing atmosphere and simultaneously removing from the ends thereof heat generated by the passage of the current to heat the center portion only of the lead-in to its oxidizing temperature, moving said sheath longitudinally from the end to the oxidized center portion of the lead-in, creating a neutral atmosphere about the lead-in and then passing a current through the lead-in while removing heat from its ends to heat the vitreous sheath to its softening temperature progressively outward from its center and join it progressively to the lead-in to avoid bubbles in the vitreous portion of the completed seal.

2. The method of sealing together an oxidized lead-in of predetermined length and a glass sheath which comprises the steps of positioning the sheath about the center portion of the lead-in, passing through the lead-in in a neutral atmosphere an electric current of sufficient magnitude to heat its center portion sufficiently to soften the glass sheath and simultaneously removing from the ends of the lead-in heat generated by the passage of said current therethrough whereby the glass is joined to the lead-in progressively to avoid bubbles in the glass portion of the completed seal.

3. The method of sealing together an oxidized lead-in of predetermined length and a glass sheath which comprises the steps of positioning the lead-in horizontally with the sheath about the center portion of the lead-in, rotating the lead-in about its longitudinal axis, passing through the lead-in in a neutral atmosphere an electric current of sufficient magnitude to heat its center portion sufficiently to soften the glass sheath and simultaneously removing from the ends of the lead-in heat generated by the passage of said current therethrough whereby the glass is joined to the lead-in progressively to avoid bubbles in the glass portion of the completed seal.

MAURICE DESCARSIN.

REFERENCES CITED

The following references are of record in the file of this patent:

UNITED STATES PATENTS

| Number | Name | Date |
|---|---|---|
| 966,784 | Anderson | Aug. 9, 1910 |
| 1,280,825 | Pacz | Oct. 8, 1918 |
| 1,500,789 | Aoyagi | July 8, 1924 |
| 1,647,296 | Jefferies | Nov. 1, 1927 |
| 1,993,400 | Convers | Mar. 5, 1935 |
| 2,037,853 | Danner | Apr. 21, 1936 |
| 2,279,168 | Kalischer et al. | Apr. 7, 1942 |

FOREIGN PATENTS

| Number | Country | Date |
|---|---|---|
| 549,277 | Great Britain | Nov. 13, 1942 |